J. G. HOLLINGSWORTH.
DENTAL PLATE CLEANER.
APPLICATION FILED NOV. 29, 1918.

1,315,499.

Patented Sept. 9, 1919.

INVENTOR
Jeptha G. Hollingsworth.
BY
George Y. Thorpe
ATTORNEY

UNITED STATES PATENT OFFICE.

JEPTHA G. HOLLINGSWORTH, OF KANSAS CITY, MISSOURI.

DENTAL-PLATE CLEANER.

1,315,499.　　　　　Specification of Letters Patent.　　Patented Sept. 9, 1919.

Application filed November 29, 1918. Serial No. 264,540.

*To all whom it may concern:*

Be it known that I, JEPTHA G. HOLLINGSWORTH, a citizen of the United States, residing at Kansas City, in the county of Jackson and State of Missouri, have invented certain new and useful Improvements in Dental-Plate Cleaners, of which the following is a specification.

This invention relates to dental plate cleaners. As well known in the art and particularly to wearers, the slimy accretions on dental plates are difficult of removal, as scratching or roughening the surface of the plate must be avoided because of the extreme sensitiveness of the tongue. Brushes of various kinds are marketed as dental plate cleaners, but none will efficiently or thoroughly clean the accretions from the plates unless an abrasive is employed, the use of the abrasive being objectionable because the surface of the plate is scratched or roughened and therefore hurtful to the tongue.

My object is to produce a simple, durable, cheap and efficient device which will thoroughly clean and burnish dental plates without the use of an abrasive or any accessory. More specifically, my object is to produce, as a new article of manufacture, a sanitary cleaner composed of split quills bunched or compacted firmly together in a handle.

With this object in view, the invention consists in certain novel and useful combinations of parts as hereinafter set forth; and in order that it may be fully understood reference is to be had to the accompanying drawing, in which.

Figure 1:
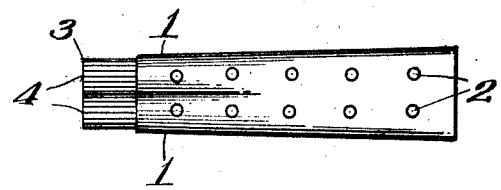
Figure 1, is a plan view of a dental plate cleaner and burnisher embodying the invention.
Figure 2:
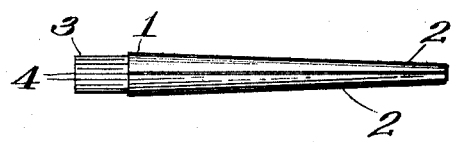
Fig. 2, is a side view of the same.
Figure 3:
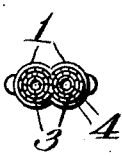
Fig. 3, is an end view of the same.

In the said drawing, a plate preferably of oblong rectangular form, is bent to produce one or more substantially hollow cylindrical portions 1, and said plate is provided with a plurality of perforations 2. In the cylindrical portion or portions 1 are fitted bunched quills 3, and the ends of the bunched quills are split as at 4 to provide for very limited resiliency or flexibility, as by giving the quills some spring action, they are adapted for efficiently cleaning dental plates by a scraping and burnishing action, in a most expeditious manner.

The device can be easily cleaned, and the fact that the handle is provided with perforations will permit it to be thoroughly cleaned and sterilized without necessitating the removal of the quills from position.

In practice the device is brushed forcibly across the dental plate and serves to completely remove all accretions therefrom and incidentally burnish the plate.

With a device of this character the plate can be kept clean, sanitary and smooth so that it shall not be objectionable because unsanitary or an irritant to the tongue, as the quills while capable of cutting the accretions from the plate, will not scratch or abrade its surface, in fact they will smooth or burnish it, and this is true regardless of the composition of the plate that is whether it is made of gold, rubber or any equivalent substance.

The drawing shows the preferred construction of the device but it is obvious that the same may be modified without departing from the invention as claimed.

I claim:

As a new article of manufacture, a dental plate cleaner comprising a handle having an opening in one end and feather quills secured in said opening and projecting from the handle, the quills being closely compacted to form a stiff scraping and burnishing brush.

In testimony whereof I affix my signature.

JEPTHA G. HOLLINGSWORTH.

Copies of this patent may be obtained for five cents each, by addressing the "Commissioner of Patents, Washington, D. C."